United States Patent [19]

Tadokoro et al.

[11] 4,241,368
[45] Dec. 23, 1980

[54] MAGNETIC SHEET RECORDER WITH A MAGNETIC SHEET SURFACE TREATING MEANS

[75] Inventors: Eiichi Tadokoro; Tatsuji Kitamoto, both of Odawara, Japan

[73] Assignee: Fuji Photo Film Co., Ltd., Kanagawa, Japan

[21] Appl. No.: 24,209

[22] Filed: Mar. 27, 1979

Related U.S. Application Data

[63] Continuation of Ser. No. 835,791, Sep. 22, 1977, abandoned.

[30] Foreign Application Priority Data

Nov. 9, 1976 [JP] Japan .................. 51-134535

[51] Int. Cl.³ .................. G11B 3/58; G11B 25/04
[52] U.S. Cl. .................. 360/128; 274/47; 360/137
[58] Field of Search .......... 360/128, 137, 86, 97–98; 358/128; 274/47; 15/93 R, 210 R, 306, 308, 256.5

[56] References Cited

U.S. PATENT DOCUMENTS

| | | | |
|---|---|---|---|
| 3,370,982 | 2/1968 | Hayunga | 360/137 |
| 3,486,757 | 12/1969 | Loescher | 274/47 |
| 3,602,940 | 9/1971 | Barbeau et al. | 360/137 |
| 3,609,721 | 9/1971 | Meneley | 274/47 |
| 3,717,855 | 2/1973 | Van Acker | 274/47 |
| 3,767,210 | 10/1973 | Havens et al. | 360/128 |
| 3,897,069 | 7/1975 | Lee | 274/47 |

OTHER PUBLICATIONS

IBM Tech. Disc. Bull., N.E. Slindee, Burnishing Method and Apparatus for Flexible Disks, vol. 19, No. 10, Mar. 1977, pp. 3829–3830.
IBM Tech. Disc. Bull., P. J. Badum, Magnetic Tape Cleaner, vol. 3, No. 10, Mar. 1961, p. 14.

*Primary Examiner*—Alfred H. Eddleman
*Attorney, Agent, or Firm*—Harold L. Stults

[57] ABSTRACT

In a magnetic sheet recorder, a scraping member is mounted in association with a magnetic head to be put into contact with the magnetic layer of a magnetic sheet together with the magnetic head. The scraping member is mounted ahead of the head so as to treat the recording track of the magnetic sheet in advance of the head when the magnetic sheet is rotated. The scraping member removes from the surface of the magnetic layer scratches and dust particles which cause drop-out of the output level.

13 Claims, 6 Drawing Figures

MAGNETIC SHEET RECORDER WITH A MAGNETIC SHEET SURFACE TREATING MEANS

This is a continuation of application Ser. No. 835,791, filed Sept. 22, 1977, now abandoned.

BACKGROUND OF THE INVENTION

1. Field of the Invention

This invention relates to a magnetic sheet recording and reproducing apparatus, and more particularly to a magnetic sheet recording and reproducing apparatus with a surface treating means for removing from the surface of the magnetic sheet dust particles, scratches and the like which would cause drop-out of the reproduction output level.

2. Description of the Prior Art

Recently, magnetic recording sheets (hereinafter referred to simply as "magnetic sheets") have come into use for various purposes. The magnetic sheet comprises a support film base with a thickness of about $3\mu$ to 1 mm and a magnetic layer carried thereon with a thickness of about $0.05\mu$ to $100\mu$. The magnetic sheet generally has a circular configuration with a diameter of 10 to 50 cm having a center opening for engagement with a rotating member of a magnetic sheet recording and reproducing apparatus (hereinafter referred to simply as "magnetic sheet recorder"). The magnetic layer is applied to the support film base in the form of a coating including magnetic particles and a binder. If desired, a protective layer may be provided on the magnetic layer.

As the support film base, may be used for example, polyester, polyolefin, cellulose derivertives, vinyl resins, non-magnetic metals such as copper, ceramics or laminated paper.

Generally, $\gamma$-$Fe_2O_3$, or sometimes $Fe_3O_4$, is used as the magnetic particles. Thermoplastic resins, thermosetting resins or the like are used as the binder.

As is well known in the art, when the surface of the magnetic layer of the magnetic sheet is not flat, or when there are scratches or irregularities in the surface of the magnetic layer, drop-out of the reproduction output level is caused, i.e., the reproduction output level is suddenly lowered momentarily. Dust particles entrapped in the magnetic layer when said coating is solidified or dust particles simply adhering to the surface of the magnetic layer also cause drop-out.

There have been proposed various methods for removing dust particles adhering to the surface of a magnetic sheet. In one of the methods, dust particles are removed by means of a brush. In another method, there is used a cleaning sheet formed of a material such as a non-woven fabric or the like having a soft and rough surface or a porous surface. However, such conventionally proposed methods are only directed to removing dust particles simply adhering to the surface of the magnetic layer, and can remove neither irregularities in the surface of the magnetic layer nor dust particles entrapped in the magnetic layer.

SUMMARY OF THE INVENTION

In light of the foregoing observations and the description, the primary object of the present invention is to provide a magnetic sheet recorder with a surface treating means for scraping the surface of the magnetic layer of a magnetic sheet to eliminate the irregularities therein and remove the dust particles entrapped in the magnetic layer.

Another object of the present invention is to provide a magnetic sheet recorder with a surface treating means which can eliminate the irregularities of the magnetic layer and remove the dust particles entrapped therein simultaneously with recording or reproduction.

The above objects of the present invention can be accomplished by providing in the magnetic sheet recorder a scraping means for scraping the surface of the magnetic layer.

The scraping means has a scraping member which is put into contact with the surface of the magnetic layer of a magnetic sheet as the magnetic sheet is rotated, and is moved in the radial direction of the magnetic sheet thereby scraping the surface thereof to remove scratches, dust particles or the like which would cause drop-out of the output level. It is preferred that the position of the scraping member with respect to the magnetic sheet in the direction perpendicular thereto be adjustable so that the pressure with which the scraping member is put into contact with the magnetic sheet can be adjusted.

When only wiping or cleaning of the magnetic layer surface is required, the scraping member is put into contact with the surface with a very small pressure. When there are dust particles entrapped in the magnetic layer or scratches on the surface and the scraping of the surface of the magnetic layer is desired, the scraping member is put into contact with the magnetic layer surface with a relatively large pressure.

In a preferred embodiment of the present invention, the grinding member is mounted on the side of the magnetic head of a magnetic sheet recorder so as to contact the recording track of the magnetic sheet in advance of the head when the magnetic sheet is rotated. With this arrangement, wiping or scraping of the magnetic sheet can be performed together with the recording or reproducing operation.

Before shipping the magnetic sheets from the factory it has heretofore been required to conduct a severe inspection of the products for detecting scratches or dust particles entrapped in the magnetic layer during the manufacturing processes and the need for this inspection increased the manufacturing cost of the magnetic sheet. As it is very difficult to detect all defects in the products, there has been a danger that inferior products might be accidentally delivered to a user who would then not be able to enjoy a satisfactory performance from the magnetic sheet. Furthermore, if the surface of a magnetic sheet is scratched in use, the user cannot enjoy satisfactory performance.

However, when utilizing a magnetic sheet recorder of the present invention, severe inspection of the products becomes unnecessary, and the manufacturing cost of the magnetic sheet can be lowered. Furthermore, even if some scratches are formed on the surface of the magnetic layer of the magnetic sheet in use, the user can still enjoy satisfactory performance from the magnetic sheet by operating the surface treating means or the scraping member provided in the magnetic sheet recorder of the present invention.

DESCRIPTION OF THE PREFERRED EMBODIMENTS

Figure 1:
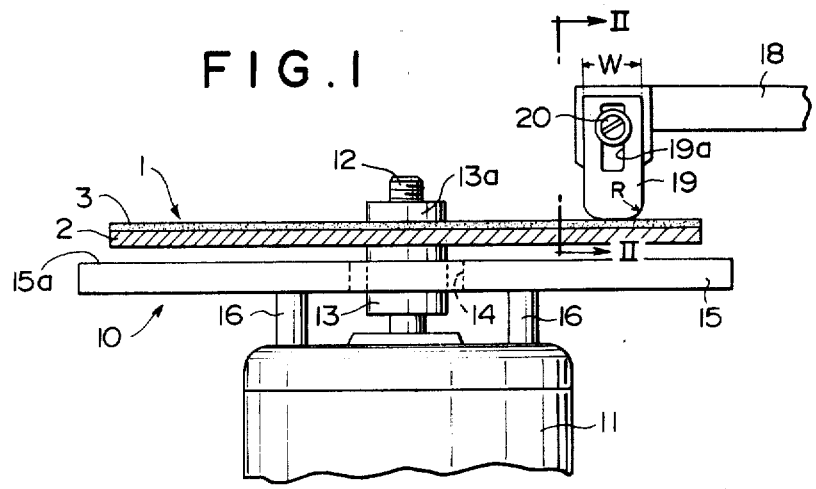
FIG. 1 is a fragmentary side view partly in cross section illustrating an embodiment of the present invention.

Now preferred embodiments of the present invention will be described in detail referring to the drawings.

Figure 2:
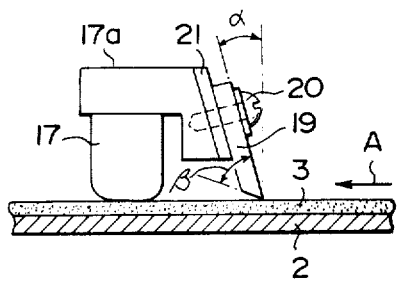
FIG. 2 is an enlarged fragmentary cross sectional view taken along line II—II of FIG. 1.

FIGS. 1 and 2 illustrate a magnetic sheet recorder in accordance with an embodiment of the present invention.

As shown in FIG. 1, a magnetic sheet recorder 10 of this embodiment includes a driving motor 11. A rotatable member 13 is fixed to the rotating shaft 12 thereof. The rotating shaft 12 and the rotatable member 13 extend through a center opening 14 provided in a back plate 15 having a flat top surface 15a. The back plate 15 is fixedly connected to the body of said driving motor 11 by means of a pair of support columns 16.

A magnetic recording sheet 1 comprising a flexible support base 2 and a magnetic layer 3 carried thereon is put on the rotatable member 13 with its center opening (not shown) engaged with the rotating shaft 12 of the driving motor 11. The magnetic sheet 1 is held in a position spaced from the back plate 15 by means of the rotatable member 13 and a holding piece 13a which is screwed on the rotating shaft 12.

The magnetic sheet 1 is flexible and accordingly its edge or peripheral portion comes into contact with the back plate 15 when the magnetic sheet 1 is not rotated, while when the magnetic sheet 1 is rotated the peripheral portion is lifted from the back plate 15 by centrifugal force and the magnetic sheet 1 becomes like a rigid disc.

Upon recording or reproduction, a magnetic head 17 (see FIG. 2) is put into contact with the magnetic layer 3 of the magnetic sheet 1 as the sheet 1 is rotated by the driving motor 11. The magnetic head 17 is supported on a movable arm 18 which is controlled by a well known conventional mechanism to move the head 17 in the radial direction of the magnetic sheet 1.

To one side of the magnetic head 17 (of the sides as viewed from the direction perpendicular to that in which the magnetic head 17 is moved relative to the side which is ahead of the magnetic head 17 relative to the direction of rotation of the magnetic sheet 1,) is mounted a scraping blade 19 which contacts the recording track of the magnetic sheet 1 in advance of the head 17, thereby wiping or scraping the surface of the magnetic layer 3 prior to the recording or reproducing by the head 17.

The scraping blade 19 is mounted on a magnetic head holder 17a (FIG. 2) by means of a screw 20 with a vibration absorber 21 formed of a rubber sheet interposed between the blade 19 and the head holder 17a. The screw 20 is screwed into the head holder 17a through an elongated opening 19a provided in the scraping blade 19 so that the position of the blade 19 in the vertical direction can be adjusted with respect to the head 17.

When recording or reproducing, the magnetic sheet 1 is rotated by means of the driving motor 11 in the direction of arrow A shown in FIG. 2, while the magnetic head 17 and the scraping blade 19 are kept in contact with the surface of the magnetic layer 3. When the scraping blade 19 is in contact with the magnetic layer 3 with relatively high pressure, the scraping blade 19 will scrape the magnetic layer 3 to flatten the surface thereof, eliminate scratches therein and remove dust particles entrapped therein as well as those dust particles simply adhering to the surface of the magnetic layer 3.

The pressure with which the scraping blade 19 is put into contact with the magnetic layer 3 is selected to be equal to or slightly larger than the pressure of the magnetic head 17 on the magnetic layer 3. The pressure is varied depending on, for example, the rotating speed of the magnetic sheet and the flexibility thereof. Therefore, the position of the scraping blade 19 is adjusted depending on such conditions.

When the scraping of the magnetic layer 3 is not necessary and it is only required to remove the dust particles simply adhering to the surface of the magnetic layer 3, the scraping blade 19 is shifted upward so that the blade 19 only lightly touches the surface of the magnetic layer 3.

When neither the scraping nor the wiping of the magnetic layer 3 is required, the scraping blade 19 is shifted further upward so that the lowermost edge thereof does not contact the magnetic layer 3.

Although the material of the scraping blade 19 may be selected in accordance with the material of the magnetic layer 3, carbon steel, high-speed steel, tungsten super alloy, sapphire, diamond or the like is suitable. The configuration of the scraping blade 19 may be selected in accordance with the material thereof. A scraping blade with a configuration like a cutting tool for machining, block-gauge or disk is suitable. A commercially available razor blade can also be used. The width of the blade 19 should be at least equal to the width of one recording track which is generally $50\mu$ to $200\mu$.

The scraping blade 19 is mounted on the magnetic head holder 17a in such a manner that the rake angle $\alpha$ is within the range of 0° to 45°, and preferably of 10° to 30°. The angle of the edge $\beta$ is within the range of 5° to 90° and preferably of 40° to 70°. Both sides of the lowermost edge of the scraping blade 19 are preferably rounded and the radius of curvature R thereof is preferably within the range of 3 mm to 15 mm, especially 5 mm to 10 mm.

Said vibration absorber 21 for resiliently mounting the scraping blade 19 prevents the vibration possibly generated by scraping of the magnetic layer 3 from being transmitted to the magnetic head 17 as this vibration would adversely affect the performance of the magnetic head 17. Although, in the embodiment shown in FIG. 2, a rubber sheet is employed as the vibration absorber 21, the absorber 21 may be a spring formed of a suitable material such as metal.

Figure 3:
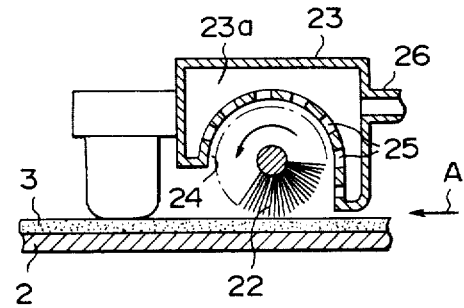
FIG. 3 is a view similar to FIG. 2 illustrating another embodiment of the present invention.

Another embodiment of the present invention is illustrated in FIG. 3.

In this embodiment, a rotating nylon brush 22 is used as the grinding member. The brush 22 is rotated by a driving means which is not shown at a high speed generally of 600 to 8000 rpm so that at its area of contact with the magnetic sheet 1 it moves in the direction opposite to the direction of the rotation of the magnetic sheet 1 shown by arrow A. As shown in FIG. 3, the upper portion of the nylon brush 22 is surrounded by a hollow casing 23 which has an internal surface substantially semicircular in cross section. The casing 23 has a cavity 23a in its interior which is communicated with a room 24 around the brush 22 through a plurality of openings 25. The casing 23 is connected with a suction pump means (not shown) through a flexible tube 26 to suck up and remove from the vicinity of the magnetic sheet 1 dust particles produced by the brushing action, thereby preventing such dust particles from soiling the track of the magnetic sheet 1 or the environment.

A suction means similar to that employed in this embodiment can also be used together with the grinding blade 19 employed in the embodiment shown in FIGS. 1 and 2.

In a modification of this embodiment, an abrasive tape is wound around the nylon brush 22. The abrasive tape comprises a base material such as polyester film and an abrasive compound such as $Cr_2O_3$ or the like applied to the base material in a coating mixed with a binder substance. In this modification, dust particles produced by brushing can be removed by a soft fibrous sheet such as a non-woven fabric disposed between the magnetic head 17 and the abrasive tape.

Figure 4:
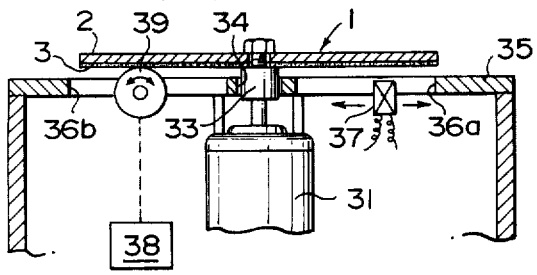
FIG. 4 is a fragmentary side view partly in cross section similar to FIG. 1 illustrating still another embodiment of the present invention, and FIGS. 5 and 6 respectively show different types of scraping members which can be used in the present invention.

Still another embodiment of the present invention is illustrated in FIG. 4.

In this embodiment, a magnetic sheet 1 having a magnetic layer 3 facing downward is supported on a rotatable mamber 33. Similarly to the embodiment shown in FIG. 1, the rotatable member 33 is fixed to a rotating shaft 32 of a driving motor 31 and projects upward through a center opening 34 of a back plate 35. The back plate 35 is provided with first and second elongated openings 36a and 36b respectively extending in the radial direction of the magnetic sheet 1.

Figure 5:
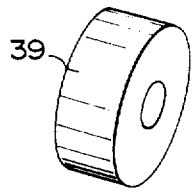
Figure 6:
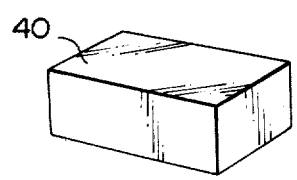

A magnetic head 37 is moved upward through the first opening 36a to be put into contact with the magnetic layer 3 from below and is moved along the first opening 36a during recording or reproduction. A scraping member 39 of disc shape as shown in FIG. 5 is moved upward through the second opening 36b to be put into contact with the magnetic layer 3 of the magnetic sheet 1 from below, and is moved along the second opening 36b. The scraping member 39 is moved and controlled by control means 38. The scraping member 39 is supported rotatably with one of its peripheral edges being in scraping contact with the magnetic layer 3. Instead of the disc shaped scraping member 39, a block shaped scraping member 40 as shown in FIG. 6 can be suitably used. Further, the scraping member may be repeatedly moved back and forth.

Two examples of the present invention will now be described with detailed reference to dimensions and other data.

EXAMPLE I

Three groups of magnetic sheets each consisting of ten sheets were tested of their life time, envelope and dropout. The magnetic sheets were circular in shape, had a diameter of 20 cm and were provided with a center opening having a diameter of 2 cm. The magnetic sheets were prepared by applying a coating mixture as described below to a web of PET (polyethylene terephthalate) film base, calendering the web coated with the mixture and then stamping out magnetic sheets from the calendered web. The thickness of the PET base was 22μ and the thickness of the magnetic layer was 7μ.

| Composition of the coating mixture | |
| --- | --- |
| magnetic particles (γ-$Fe_2O_3$) | 300g |
| polyester-polyurethane (molecular weight: about 40,000, a reaction product of 2,4-diphenyl-methandiisocyanate and hydroxyl terminated polyester derived from butanediol and adipic acid) | 45g |
| synthetic non-drying oil modified alkyd resin (oil content 25%) (Burnock DE-241-70 made by Japan Reichhold Co.) | 28g |
| silicone oil (dimethylpolisiloxane) | 8g |
| isocyanate compound (75 wt % of ethyl acetate solution of a reaction product of 3 mols of 2,4-tolylenediisocyanate and 1 mol of trimethylolpropane, Desmodur L-75 made by Bayer A.G) | 4.5g |
| butyl acetate | 900cc |
| methyl ethyl keton | 400cc |

The surface of the magnetic layer of the magnetic sheets belonging to the first group was neither wiped nor scraped.

The surface of the same belonging to the second group was wiped by a conventional method, in which the magnetic sheet was rotated at a speed of 3600 rpm and was put into contact with a cleaning sheet disposed between the magnetic sheet and the back plate of a magnetic sheet recorder. The cleaning sheet was made of non-woven fabric having a mean depth of surface irregularity of 0.1 mm. The cleaning time was 30 seconds.

The surface of the magnetic layer of the magnetic sheet belonging to the third group was scraped by a scraping device of the embodiment shown in FIG. 4 having the following dimensions:

| | |
| --- | --- |
| scraping member | disc shaped having a diameter of 50mm. edge angle 90° (angle of relief 15°, without a flank) formed of special tool steel (SKS) |
| revolution speed of magnetic sheet | 3600 rpm |
| scraping time | 30 seconds |

*The magnetic sheet was lifted 0.5mm from the standard position during recording or reproduction, and the scraping member was moved in the radial direction of the magnetic sheet at a speed of 1mm/sec.

Said three groups of magnetic sheets treated in the above mentioned different manners were measured of their life time, envelope and drop-out.

In this example, these measured items were defined as follows.

Life time: The time over which the output level of reproduction is reduced 3 dB from the initial level when a signal of 1 MHz is recorded on a magnetic sheet and then repeatedly reproduced.

Envelope: The relationship between the maximum level (SA) and the minimum level (SB) (represented by the value 20 log SA/SB) of reproduction output in one cycle of rotation of a magnetic sheet recorded with a signal of 4 MHz. Said value should ideally be 0 dB. Practically, it is preferred to be not more than 3 dB.

Dropout: Lowering of output level in reproduction exceeding 3 dB below the average output level continuously for 20 microseconds or more when a signal of 4 MHz is recorded on a magnetic sheet.

For recording and reproduction was used a magnetic sheet recorder in which the magnetic sheet was rotated at 3600 rpm. The width of the recording track was 125μ and the width of the magnetic head was 300μ.

The results were as shown in Table I. In Table I, the values shown for the above three items are the average values for the ten magnetic sheets of the respective groups.

TABLE I

| group | life time | envelope | drop-out |
|---|---|---|---|
| first group | 180 | 1.8 | 1.2 |
| second group | 200 | 1.8 | 0.4 |
| third group | 300 | 0.3 | 0 |

EXAMPLE II

A test similar to example I was performed using magnetic sheets comprising a PET base of 75μ thickness and a magnetic layer of 3μ thickness coated thereon. The composition of the coating was as follows.

| Composition of the coating mixture | |
|---|---|
| magnetic particles (γ-Fe$_2$O$_3$) | 300g |
| copolymer of vinylchloride and vinylidene chloride (copolymerization ratio ⇌ 7:3, degree of polymerization: 400) | 25g |
| epoxy resin (reaction product of bisphenol A and epichlorhydrine, molecular weight = 900, epoxy equivalent = 460~520, hydroxyl group content = 0.29%, Epicoat 1001 made by Shell Oil Co.) | 12g |
| silicone oil (dimethylpolysiloxane) | 6g |
| Cr$_2$O$_3$ (mean particle size of 5μ) | 8g |
| isocyanate compound (75 wt% of ethyl acetate solution of a reaction product of 3 mols of 2,4-tolylenediisocyanate and 1 mol of trimethylolpropane, Desmodur L-75 made by Bayer A.G) | 1.4g |
| butyl acetate | 1200cc |

The magnetic sheets were divided into three groups each consisting of ten magnetic sheets.

The first and second groups were treated in the same manner as the first and second groups of Example I. The surface of the magnetic layer of the mangetic sheets belonging to the third group was scraped by a similar device to that used in Example I except that a block-gauge-like scraping blade as shown in FIG. 6 was used instead of the disc shaped scraping member. The block shaped scraping blade was made of super hard alloy (G-5).

Its width, height and length were 1 mm, 10 mm and 20 mm, respectively. Similarly to Example I, the three groups were measured of their life time, envelope and drop out.

In this example these items were defined as follows.

Life time: The time over which the output level of reproduction is reduced to 75% of the initial level when a square wave signal of 250 KHz is recorded on the track of a magnetic sheet and then repeatedly reproduced at a rate of 360 rpm.

Envelope: The relationship between the maximum level and the minimum level (represented by dB) of reproduction output when recording and reproducing a signal of 250 KHz at a rate of 360 rpm.

Drop-out: Lowering of output level of reproduction below 40% of the average output level, when a square wave signal of 250 KHz is recorded and reproduced at a rate of 360 rpm.

The same magnetic sheet recorder as that used in Example I was used. The results were as shown in Table II.

TABLE II

| group | life time | envelope | drop-out |
|---|---|---|---|
| first group | 148 | 2 | 5 |
| second group | 162 | 2 | 2 |
| third group | 200 | 1.5 | 0 |

We claim:

1. A magnetic sheet recorder provided with means for rotating a magnetic sheet having a magnetic layer, a back plate supporting the magnetic sheet, head support means, and a magnetic head supported on said head support means and which is put into contact with the magnetic layer of the magnetic sheet and moved substantially in the radial direction for recording or reproduction, wherein the improvement comprises a surface treating means provided in said recorder to be put into contact with the magnetic layer of the magnetic sheet simultaneously with said magnetic head for removing from the surface of the magnetic layer dust particles, scratches and the like thereon and said surface treating means being movable substantially in the radial direction of the magnetic sheet as the magnetic sheet is rotated, said surface treating means being mounted on said head support means on the leading side of said magnetic head and positioned to contact the area of the recording track of said magnetic sheet simultaneously with and in advance of such contact by said magnetic head.

2. A magnetic sheet recorder as defined in claim 1 wherein said surface treating means is a scraping blade made of a material harder than that of the magnetic layer, the width of the scraping blade being at least equal to the width of the recording track.

3. A magnetic sheet recorder as defined in claim 2 wherein said scraping blade is resiliently mounted on the front part of the magnetic head by means of a vibration absorber interposed between the scraping blade and the magnetic head whereby the vibration generated by the scraping action of the blade is prevented from being transmitted to the head.

4. A magnetic sheet recorder as defined in claim 3 wherein said vibration absorber comprises a rubber sheet.

5. A magnetic sheet recorder as defined in claim 3 wherein said vibration absorber comprises a metal spring.

6. A magnetic sheet recorder as defined in claim 1 wherein said surface treating means is a rotating brush made of nylon fabric which is rotated at a high speed.

7. A magnetic sheet recorder as defined in claim 6 wherein said rotating brush is rotated at a speed of 600 to 8,000 rpm.

8. A magnetic sheet recorder as defined in claim 6 wherein a suction means is further provided adjacent to the rotating brush to suck up and remove dust particles produced by the surface treating action of the brush.

9. A magnetic sheet recorder provided with means for rotating a magnetic sheet having a magnetic layer, a back plate supporting the magnetic sheet, and a magnetic head which is put into contact with the magnetic layer of the magnetic sheet and moved substantially in the radial direction for recording or reproduction, wherein the improvement comprises a surface treating means provided in said recorder to be put into contact with the magnetic layer of the magnetic sheet simultaneously with said magnetic head for removing from the surface of the magnetic layer dust particles, scratches and the like thereon, said surface treating means being movable substantially in the radial direction of the magnetic sheet as the magnetic sheet is rotated; a pair of elongated openings respectively extending in radial directions of the magnetic sheet provided in said back plate, and said magnetic head and the surface treating means are put into simultaneous contact with the magnetic layer of the magnetic sheet through the respective openings and moved radially therealong.

10. A magnetic sheet recorder as defined in claim 9 wherein the pressure with which said surface treating means is put into contact with the magnetic layer is adjustable.

11. A magnetic sheet recorder as defined in claim 9 wherein said surface treating means is a scraping member made of a material harder than that of the magnetic layer of the magnetic sheet, the width of the scraping member being at least equal to the width of the recording track.

12. A magnetic sheet recorder as defined in claim 11 wherein said scraping member is disc shaped and has a peripheral edge put into contact with the magnetic layer.

13. A magnetic sheet recorder as defined in claim 11 wherein said scraping member is of block shape.

* * * * *